(12) United States Patent
Brenneis et al.

(10) Patent No.: US 9,254,802 B2
(45) Date of Patent: Feb. 9, 2016

(54) METHOD FOR OPERATING A SAFETY SYSTEM OF A MOTOR VEHICLE AND MOTOR VEHICLE

(71) Applicant: AUDI AG, Ingolstadt (DE)

(72) Inventors: Oliver Brenneis, Garching (DE); Jörn Freyer, München (DE); Christopher Hantschke, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 240 days.

(21) Appl. No.: 13/624,201

(22) Filed: Sep. 21, 2012

(65) Prior Publication Data

US 2013/0261869 A1 Oct. 3, 2013

(30) Foreign Application Priority Data

Sep. 24, 2011 (DE) .......................... 10 2011 115 223

(51) Int. Cl.
| | |
|---|---|
| *G01C 22/00* | (2006.01) |
| *B60R 21/00* | (2006.01) |
| *B60W 50/02* | (2012.01) |
| *B60W 50/14* | (2012.01) |
| *B60W 30/08* | (2012.01) |
| *B60W 30/02* | (2012.01) |
| *B60W 30/085* | (2012.01) |
| *B60W 40/08* | (2012.01) |

(52) U.S. Cl.
CPC ............... *B60R 21/00* (2013.01); *B60W 30/08* (2013.01); *B60W 50/0205* (2013.01); *B60W 50/0225* (2013.01); *B60W 50/14* (2013.01); *B60W 30/02* (2013.01); *B60W 30/085* (2013.01); *B60W 2030/082* (2013.01); *B60W 2040/0881* (2013.01); *B60W 2050/146* (2013.01); *B60W 2550/10* (2013.01); *B60W 2550/408* (2013.01); *B60W 2750/40* (2013.01)

(58) Field of Classification Search
None
See application file for complete search history.

(56) References Cited

U.S. PATENT DOCUMENTS

| | | | | |
|---|---|---|---|---|
| 4,146,891 | A | | 3/1979 | Fujiki et al. |
| 6,006,158 | A | * | 12/1999 | Pilley et al. .................... 701/120 |

(Continued)

FOREIGN PATENT DOCUMENTS

| | | | | |
|---|---|---|---|---|
| CN | 1468761 A | 1/2004 | ............. | B60R 21/32 |
| CN | 1882458 A | 12/2006 | ............. | B60R 21/01 |

(Continued)

OTHER PUBLICATIONS

European Search Report issued on Dec. 13, 2012, together with an English translation of the relevant pages.

(Continued)

*Primary Examiner* — Adam Alharbi
(74) *Attorney, Agent, or Firm* — Henry M. Feiereisen LLC

(57) ABSTRACT

A method for operating a safety system of a motor vehicle includes the steps of determining a target trajectory of the motor vehicle to be realized with the safety system after an unavoidable collision, wherein the target trajectory is assigned to a target position of the motor vehicle, which target position is safe with regard to secondary collisions, and performing at least one autonomous and/or supporting driving intervention in the form of at least one of a longitudinally guiding intervention and a transverse guiding intervention after the collision for realizing the target trajectory.

21 Claims, 1 Drawing Sheet

(56) References Cited

U.S. PATENT DOCUMENTS

| | | | |
|---|---|---|---|
| 6,480,144 B1 | 11/2002 | Miller et al. | |
| 7,418,345 B2 | 8/2008 | Diebold et al. | |
| 2005/0134440 A1* | 6/2005 | Breed | 340/435 |
| 2006/0031015 A1* | 2/2006 | Paradie | 701/301 |
| 2006/0219428 A1 | 10/2006 | Yamashita | B60K 28/00 |
| 2006/0219458 A1 | 10/2006 | Yamashita | |
| 2008/0042878 A1* | 2/2008 | Heng | 340/936 |
| 2010/0066562 A1 | 3/2010 | Stählin et al. | |

FOREIGN PATENT DOCUMENTS

| | | | |
|---|---|---|---|
| CN | 1885365 A | 12/2006 | G08G 1/00 |
| CN | 201056203 Y | 5/2008 | B60T 7/22 |
| CN | 101287634 A | 10/2008 | B60W 30/08 |
| DE | 27 33 907 A1 | 2/1978 | |
| DE | 103 34 203 A1 | 3/2005 | |
| DE | 10 2005 005 412 A1 | 8/2006 | |
| DE | 10 2005 022 679 A1 | 11/2006 | |
| DE | 10 2005 037 961 A1 | 2/2007 | |
| DE | 10 2007 052 540 A1 | 7/2008 | |
| DE | 10 2008 008 555 A1 | 8/2008 | |
| DE | 10 2008 005 310 A1 | 7/2009 | |
| DE | 102009002475 | 12/2010 | |
| DE | 102009028880 | 3/2011 | |
| DE | 102010048351 | 6/2011 | |
| EP | 1 687 183 B1 | 8/2006 | |
| FR | 2 909 958 | 6/2008 | |
| WO | WO 2005/047066 | 5/2005 | |
| WO | WO 2006/045259 A1 | 5/2006 | |

OTHER PUBLICATIONS

Chinese Search Report issued by the Chinese Patent Office on Dec. 31, 2014.

* cited by examiner

METHOD FOR OPERATING A SAFETY SYSTEM OF A MOTOR VEHICLE AND MOTOR VEHICLE

CROSS-REFERENCES TO RELATED APPLICATIONS

This application claims the priority of German Patent Application, Serial No. 10 2011 115 223.0, filed Sep. 24, 2011, pursuant to 35 U.S.C. 119(a)-(d), the disclosure of which is incorporated herein by reference.

BACKGROUND OF THE INVENTION

The present invention relates to a method for operating a safety system of a motor vehicle.

The following discussion of related art is provided to assist the reader in understanding the advantages of the invention, and is not to be construed as an admission that this related art is prior art to this invention.

Active safety systems, which are configured for avoiding collisions or for mitigating the consequences of a collision, are known in the state of the art. Such systems analyze, mostly by way of a collision probability, the risk of a collision and can attempt by various measures to avoid a collision and/or to at least keep the damages in case of a collision low. The measures can include active driving interventions however also the issuance of warnings and/or instructions and the control of further vehicle systems. For example, it is known, to adjust the operating parameters of vehicle systems in anticipation of a possible or unavoidable collision to the special situation for example in accordance with a pre conditioning of dead times and the like.

In case of an unavoidable collision i.e., when the dynamic possibilities of the motor vehicle are no longer sufficient to avoid a collision with a collision partner even in case of driving interventions, severe secondary collisions can occur after the first collision. In order to counteract these secondary collisions the current state of the art mostly only contemplates interventions of the driver which however, requires that the driver is physically able to perform the intervention and the intervention is within the scope of his driving skills. However, based on experience the driver is not able in these situations to avoid further collisions by taking his own measures or at least mitigate the caused damage.

It would therefore be desirable and advantageous to provide a method for operating a safety system which increases the safety after an initial collision with regard to further collisions.

SUMMARY OF THE INVENTION

For solving this object in the method of the aforementioned type according to the invention it is provided that in case of an unavoidable collision a target trajectory of the motor vehicle to be realized after the collision is determined by the safety system which target trajectory is assigned to a safe target position and at least one autonomous and/or supporting driver intervention in the form of at least one longitudinally guiding intervention and/or transverse guiding intervention is carried out for realizing the target trajectory.

According to the invention it is thus proposed to use an intelligent control logic which is capable of determining a safe target position in particular including a target position and/or a target orientation of the motor vehicle and correspondingly a target trajectory to achieve this target position. Preferably environmental data form the basis for such a determination, which environmental data can be determined by environmental sensors of the motor vehicle, and egodata which can describe the current driving state of the motor vehicle. Thus an optimal stopping position in particular stopping position and/or stopping orientation is determined with regard to avoiding or mitigating the consequences of further collisions with obstacles in the vicinity (for example a tree or guard rail) and further accidents with further vehicles (for example vehicles on the hard shoulder or oncoming traffic.

The safety system according to the invention is configured to carry out at least one driving intervention after the first collision has occurred for avoiding further collisions which driving intervention is a function of the target position and the target trajectory. In case of a target position which only includes one target orientation it can for example be avoided that the vehicle is positioned transversely and/or it can be achieved that the motor vehicle offers more deformation space in the direction of a possible second collision and/or is lifted higher on one side in this direction and the like, which can also be achieved by driving interventions, in particular intelligent braking and/or steering.

Overall, a system is thus provided which after a first collision is capable to increase the safety with regard to possible secondary accidents in an intelligent manner by ensuring a safe placing of the motor vehicle.

Preferably, fully automatic i.e. fully autonomous interventions are carried out, because drivers are often not capable or only capable to a limited extend after a collision to contribute to a securing of the motor vehicle. In principle, a partially automatic intervention is also conceivable in which the driver is assisted in his actions, for example by visualizing an ideal stopping position via a Head-Up-Display or a reinforcement or attenuation of the driving interventions carried out by the driver.

While it was common in the state of the art to deactivate collision related safety systems after the collision, according to the invention the safety system is operated until having maneuvered the motor vehicle into a target position which is as safe as possible, so that such a safety system can also be referred to as "intelligent multi control".

In an advantageous refinement of the present invention the target trajectory can be determined by taking environmental data of the vicinity of the motor vehicle into account which have been determined before the collision. As an alternative or in addition, the target trajectory can already be determined before the collision. Thus, potential strategies with regard to further collisions are already calculated before the collision so that the possible failure of required systems can be compensated during the first collision as best as possible. If for example environmental sensors fail, the last data which were determined before the further collision can continued to be used, in particular such data in which only a very slow change is conceivable. The calculation can be continued by using the current and/or previously determined data until the motor vehicle has come to a complete halt, wherein advantageously the functionality of the relevant data sources, in particular sensors and actuators, is continuously monitored and taken into account.

In this context it is advantageous when, in the case of a trajectory which has been already determined before the collision by controlling at least one vehicle system, the collision is influenced by taking the target trajectory into account. Because the safety system which is operated according to then invention can also take over the control regarding the first collision, criteria are usually already present which determine the first collision and are geared toward mitigating the consequences of the collision. Nevertheless, even these already present first collision criteria still leave degrees of freedom which can be used in the context of the present invention with regard to the target trajectory, for example when deciding in which direction an avoidance maneuver is attempted and the like. Thus, degrees of freedom in the form of the choice of the collision point can be used. It is important however, not to compromise the safety with regard to the first collision in any way.

In a further embodiment of the present invention the target trajectory can be determined by taking an environmental model into account in which different standstill positions in the vicinity of the motor vehicle are each assigned a value which describes the safety of the standstill position with regard to second collisions. Environmental models are already known in principle in the state of the art and are manifested in different forms, in which however usually regions and/or objects are assigned different attributes. According to the invention it is proposed to provide a further attribute in the environmental model at least prior to a collision i.e., for example as soon as the collision is deemed unavoidable, which attribute is a value which describes the safety of the standstill position with regard to second collisions. For example a kind of "traffic light map" of the environment can be provided which includes red, yellow and green zones depending on the safety of the target position at these locations. In particular with regard to such environmental models the calculation of the safest target position can generally occur in such a way that a potential secondary collision severity value is determined and the lowest potential secondary collision severity value is used for the target position. Such a potential secondary collision severity value can also be the value which describes the safety of the standstill position with regard to second collisions. Such a pre-evaluation in the environmental model is particularly useful when it is determined already before the first collision because in this case even when current environmental data are not available, a predetermined information already exists which can be used even after the current environmental data have become unavailable.

It is also useful within the context of the present invention to consider a drive state model of the motor vehicle, i.e. a model of the drive state of the motor vehicle. Such drive state models are also known in the state of the art. They take ego data into account, i.e. for example driving dynamics data of the own motor vehicle to enable describing the current state of the motor vehicle itself in addition to the environmental model.

The determination and triggering of intervention strategies occurs then in dependence on the recognized/calculated dangerous situation by way of the environmental model and the driving state model, wherein for example aspects such as the current action space of the motor vehicle, the road course, the presence of ditches and slopes, the position of oncoming lanes and the like can be taken into account with regard to the environment.

It is particularly advantageous when possible static and/or moving collision partners which have been determined in the course of detecting the environment are taken into account when determining the safety of the target position and/or a standstill position, in particular the type of the possible collision partner and/or its current dynamic and/or its predicted trajectory. The determination of the target position and with this the target trajectory can thus mainly be based on possible collision partners for a second collision which can also include the collision partner of the first collision. Thus, for example the type of a possible second collision partner can be taken into account, for example its ability for absorbing energy, its classification as tree, guard rail, pedestrian, truck and the like. Further, its current expected and possible trajectory can be taken into account, in particular also with regard to the initiation of an evasive maneuver of an oncoming motor vehicle when the own motor vehicle skids onto its actual lane and the like.

Further, in particular after the collision, the functionality of data sources can be continuously monitored, in particular sensors, which provide data relating in particular to the environment (environmental data), wherein in case of loss of a data source, data of the data source which where recorded before the collision are at least partially relied on.

As mentioned above, data sources, in particular sensors which might be damaged by the first collision can be monitored continuously. If such damage exists it is conceivable to fall back on the data which have been recorded before the first collision. Diagnosis functions which report a failure of sensors or other data sources are already know in principle, however a refinement of these diagnosis functions with regard to the precision of the statements regarding the damage can be provided. For example, if a sensor is still functional in principle, however, due to the collision has assumed a completely inappropriate orientation which in particular prevents acquisition of meaningful measuring data, it can nevertheless be indicated as not reliable or only partially reliable. Such information can for example be obtained by a plausibility check of recorded sensor data.

In analogy to a monitoring of the data sources, vehicle systems to be controlled, in particular a braking system and/or engine and/or a steering are continuously monitored in particular after the collision, wherein when a vehicle system to be controlled has at least partially failed, and the target position and/or the target trajectory cannot be reached, the target position and/or the target trajectory is recalculated and/or the at least partial failure is taken into account in a cyclical recalculation of the target position and/or the target trajectory. A continuous diagnosis can thus also be carried out, wherein it is advantageous in this case when a diagnostic device provides information regarding the remaining range of functions. For example, if a steering is only partially damaged it can be reported how and, as the case may be, with which offset a steering of the motor vehicle is still possible which for example may require an adjustment of the target position and/or the target trajectory. Similarly, if only a certain capacity of the engine is available, this capacity can be provided to the safety system for its calculation. Preferably the determination is continued cyclically until the final stop of the motor vehicle, wherein the monitoring and taking into account of the functionality of the relevant data sources and actuators occurs continuously.

In this context it is particularly advantageous when a message regarding the at least partial failure of a vehicle system is transmitted via at least one communication means for communication with other road users. While a motor vehicle-to-motor vehicle communication (Car-2-Car) and a motor vehicle-to-X communication (Car-2-X) can be used as data source, ultimately equivalent to a sensor, an extended use is possible in the sense that for example malfunctions of individual vehicle systems which are detected by a diagnosis device are related to other road users. In this way its control, in particular within the context of safety systems with which other road users are provided, can be adjusted so that the limitations of the motor vehicle can be taken into account.

In particular, a communication via at least one communication means for communicating with other road users can be used for coordinating an evasive and stop strategy. Thus, within the context of the method according to the invention it is also possible to use Car-to-Car and/or Car-2-X communication in order to enable a coordinated evasion and orientation strategy of the road users in particular with regard to a possible second collision.

It is further conceivable that data which describe the second collision are transmitted to a central server in particular a traffic control center. In this way, a traffic control center can be informed early of the collision, in particular also with regard to traffic control measures after the accident. In addition, an initial estimation regarding in how far an obstruction will occur since data are obtained first hand in manner of speaking. In the further course a traffic control center can also be informed of the fact that a safe target position has been reached thus allowing the traffic control center to assess the situation more accurately with regard to this fact.

In a refinement of the invention further vehicle systems in particular an ESP system and/or an active suspension system and/or an active spring and/or shock absorber system and/or an active stabilizing system and/or a raisable hood and/or a system for adjusting the trim position can be controlled beside a brake system and/or a steering system and/or an engine to reach the target position. Beside the classical longitudinal and transverse interventions for example in the course of an active steering also a rear axle steering or an electric steering and/or a braking system and/or an engine control device, further usable actuators are also conceivable. For example, an ESP-intervention can occur analogous to an ESP-rollover-function, wherein the lateral guidance of the front axle is reduced to avoid rollovers. For adjusting the trim position i.e. for example for a lateral lifting of the motor vehicle in order to optimize the lateral collision zone, a system can be used as active suspension system which offers a vertical adjustability for each side. As can be seen, many advantageous possibilities are conceivable to increase the safety of the motor vehicle also after the first collision.

In a further refinement of the present invention, information regarding the seat occupancy and/or the loading state of the motor vehicle and/or information regarding the vehicle structure and/or localized deformation potential, in particular taking previous damage and/or damage caused by the collision into account, and/or information regarding regions of the motor vehicle which are critical in case of a collision can be taken into account. Such information is useful in order to assess the safety of a target position and/or the feasibility and safety of a target trajectory. For example, information regarding the seat occupancy which for example can be obtained via a seat occupancy sensor, allows drawing conclusions as to whether a passenger is present. If no passenger is present an increased use of the crash regions of the passenger side can be considered for example by turning the motor vehicle so that the passenger side is oriented in the direction of a possible second collision partner. Information regarding the vehicle structure and the energy absorbing potential are also relevant and advantageous to be considered because for example deformation zones for second collisions which have not been utilized in the first accident can be taken into account and the like. Thus for example, when a deformation zone is already fully utilized by the collision the vehicle can be oriented so that other deformation zones are turned in the direction of possible second collision partners. Information regarding regions of the motor vehicle which are critical during collision are preferentially considered, for example the position of the tank, battery and the like. Thus, the target position and/or the target trajectory can be chosen with regard to secondary collisions so that collisions in these zones or regions are actively avoided.

Further, the target position and/or the target trajectory can be determined by taking the data of a yawing moment sensor and/or an acceleration sensor and/or a roll angle sensor and/or a friction value sensor and/or a longitudinally guiding driver assist system and/or a laser scanner and/or a radar sensor and/or an ultrasound sensor and/or an infrared sensor and/or a LIDAR sensor and/or a GPS sensor and/or a communication means for communicating with other road users and/or a crash sensor into account.

Of course these sensors and data sources whose data are of course also combinable in the course of a data fusion or information fusion are only exemplary; it is well possible to use other and/or further sensors and/or data sources.

As mentioned above, a driver can be supported in reaching the safe target position especially in the case when a semi-automatic intervention is to be performed, in particular by reinforcing and/or attenuating longitudinally guiding interventions carried out by the driver and/or transverse guiding interventions and/or by displaying the target position and/or a target trajectory and/or a target orientation of the target position in particular on a Head-Up-Display.

Beside the method, the invention also relates to a motor vehicle including a safety system with a control device which is configured to carry out the method according to the invention. All embodiments with regard to the method are also applicable analogously to the motor vehicle according to the invention, so that the same advantages can be achieved with the same.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
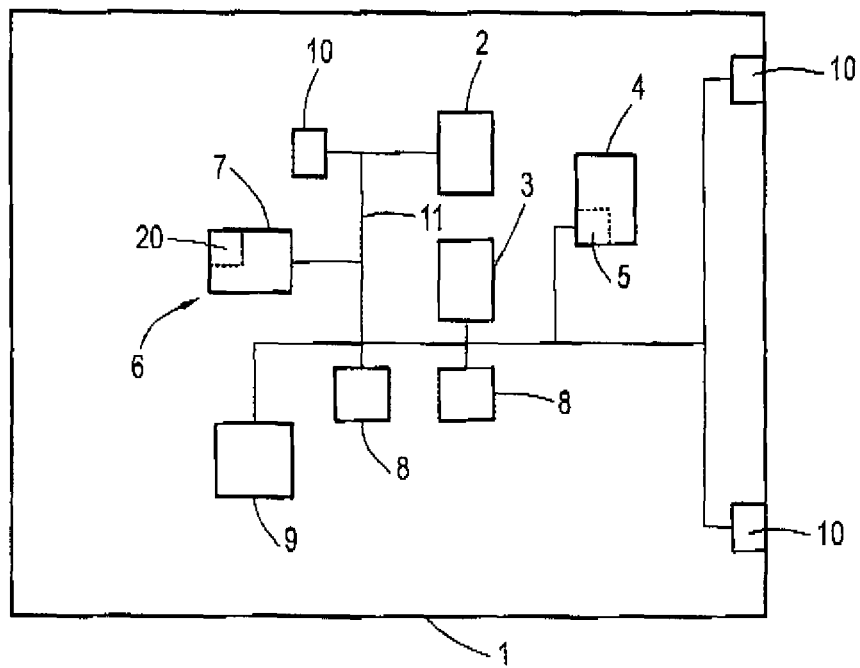
FIG. 1 shows a schematic diagram of a motor vehicle according to the invention and FIG. 2 shows a schematic diagram for explaining a further environmental model.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1 there is shown a schematic diagram of a motor vehicle 1 according to the invention including a steering system 2, a brake system 3 and an engine with an engine control device 5. Beside a safety system 6 for intelligent multi-collision control which has a control device 7 for carrying out the method according to the invention, further vehicle systems 8, in particular including driver assistance systems, are provided which are here only outlined. The motor vehicle is further configured for communication with other road users (Car-2-X-Communication) and therefore includes communication means 9.

In order to supply the different vehicle systems 2, 3, 4, 6, 8, 9 with input data for their function the motor vehicle 1 includes also different sensors 10 of which only three are shown exemplary in FIG. 1. For communication within the motor vehicle 1 a bus system 11 here a CAN-Bus is provided.

The concretely provided sensors which are also usable by the safety system 6, include a yaw moment sensor, an acceleration sensor, a roll angle sensor, a pitch angle sensor, a steering angle sensor, a friction value sensor, a camera, a laser scanner, a radar sensor, an ultrasound sensor, an infrared sensor, a LIDAR sensor, a GPS sensor and a crash sensor, wherein further sensors can of course also be provided. Further vehicle systems which can partially controlled $b_y$ the safety system, include an ESP system, an active suspension system, an active spring and/or shock absorbance system, an active stabilizing system, a raisable hood and a longitudinally guiding driver assist system, here an ACC system which can also provide environmental data or the like as a data source.

As mentioned above, the control device 7 is configured for carrying out the method according to the invention, this means it uses data of the described data sources which data have been processed in an environmental model and a driving state model, in particular data of other vehicle systems 8, the communication means 9 and the sensors, in order to determine a safe position with regard to secondary collisions when an unavoidable collision is detected—the safety system 6 is also configured for mitigating consequences of collisions—from which safe position a target trajectory to be realized which leads to the target position is also determined. In addition, the control device 7 is configured for sending out control commands via which at least one autonomous driving intervention for realizing the target trajectory is carried out in the form of at least one longitudinal guiding intervention. This determination of the target trajectory occurs continuously in the sense that ultimately the actual safety and feasibility is analyzed cyclically. The determination of the target position and the target trajectory starts as soon as an unavoidable collision is detected thus, already before the collision, and only terminates when the motor vehicle comes to a halt, in particular in the target position. Because a safe position is sought already before the collision, the collision can also be influenced by taking the target trajectory into account if degrees of freedom exist with regard to the safety of the collision itself.

Figure 2:
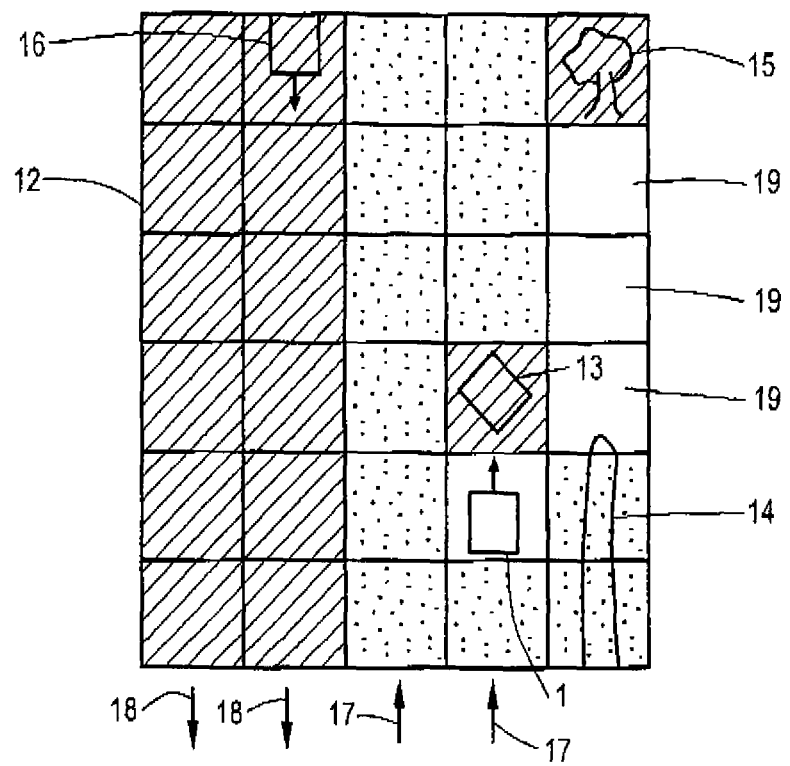

The basis for determining the target position and the target trajectory are an environmental model and a driving state model. An environmental model is generally known, wherein for example an environmental model can be used which assigns defined attributes to defined environmental regions. In the exemplary embodiment described here, different standstill position in the vicinity of the motor vehicle 1 are assigned a value which describes the safety of the standstill position with regard to the secondary collision (other aspects of the target position beside the target position i.e. in particular a target orientation or target alignment are discussed in more detail below). For this a potential further collision severity value is determined, for example for the regions covered in the environmental model, and assigned as attribute to the regions, as explained in more detail by FIG. 2 by way of a schematic diagram. Shown are the motor vehicle 1 and an environment 12 of the motor vehicle 1. After an unavoidable collision is impending, the motor vehicle 1 moves toward the collision partner 13 of the first collision. Further visible are a ditch 14, a tree and an oncoming motor vehicle 16. Lanes in the driving direction of the motor vehicle 1 are indicated at 17, lanes of the opposite direction at 18.

Analysis of the environmental situation by taking possible collision partners for a further collision into account, wherein the type of the possible collision partners, their current dynamic and the like are taken into account, allows assigning different regions a potential secondary collision severity value which describes the safety of standstill positions in this region with regard to secondary collisions. Aggravated by the oncoming motor vehicle 16, the lanes 18 of the oncoming traffic are an undesired location for placing the motor vehicle 1, as is the case for the region of the tree 15 or the collision partner 13. These regions can for example be designated "red". It is safer on the own driving lanes 17 and in the ditch 14 which however, may cause further damage. These regions can for example be designated "yellow". On the side of the road in the even, obstacle-free region 19, quite safe locations for placing the motor vehicle 1 are given ("green"). For example, the target position of the target posture could be located at these locations in the present case.

Also with regard to the alignment of the motor vehicle analyses are performed so that the target orientation or the target alignment of the motor vehicle 1 also plays a role, for example by taking into account where passengers are seated, where deformation regions are still available and the like. For example, the seat occupancy can be taken into account.

For example, if no passenger is present, the passenger side can be turned in the direction of the regions which are at risk of a secondary collision. It is also conceivable to take information into account regarding the loading state for avoiding secondary collisions in the form of roll over crashes. Further, the vehicle structure and the energy absorption potential can be taken into account, wherein in this case previous damage can be taken into account. The target position is also chosen so that collision sensitive regions of the vehicle such as the tank, the battery and the like are also protected from collisions as far as possible. Also in the case of known previous damage to the vehicle, regions can be oriented "safer". Finally, it is conceivable to also adjust the trim position of the motor vehicle 1 for example, to lift the motor vehicle 1 on one side in order to optimize the side impact zones.

In the method according to the invention, the available data sources and actuators are constantly monitored and diagnosed with regard to their functionality, while the target position and the target trajectory are cyclically determined anew. For this, the control device can include a dedicated diagnostic device 20. However, the diagnostic device can also be provided externally. The diagnostic device 20 checks whether systems have failed completely or their function is impaired. Thus, a value which describes the functionality of all data sources and actuators is determined for the data sources and actuators. In the example of the steering system 2, it is for example determined within which angle ranges a steering is still possible. In particular, damages due to the unavoidable collisions are known early and can be taken into account in order to determine the target trajectory and the target position. It is conceivable in the method according to the invention, in case of failure of a data source to continue to use the data which have been received by the data source, in particular an environmental sensor. For this reason it is particularly advantageous when the additional information is already added to an environmental model before the time point of the collision. The functionality of the actuators, first and foremost the steering system 2, the brake system, and the engine 4, is also constantly monitored and forms part of the calculation of the target position and the target trajectory, because for example the action space of the motor vehicle 1 may be restricted.

Data which have been received via the communication system can also be advantageously used in the safety system 6, so that the safety system also forms a data source as a type of sensor. It is also advantageous that in the present exemplary embodiment in case of failure of certain vehicle systems of the motor vehicle 1, the communication means communicates these failures to other road users so that the other road users can adapt their evasion strategies. In any case, the safety system 6 can generally be configured so that a coordination of evasion strategies and strategies for placing the motor vehicle 1 can occur via communication with other road users.

Finally, in other exemplary embodiments of the method according to the invention it is also possible to support the driver only semi-automatically to assume a safe position by himself. For example, a reinforcement or attenuation of interventions carried out by the driver can occur, when the driver oversteers the steering wheel. A display of the target position, for example via a here not further shown Head-Up-Display of the motor vehicle 1 can be realized for supporting the driver when the driver is to assume the safe target position essentially by himself.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for operating a safety system of a motor vehicle comprising the steps of:
    after an unavoidable collision, determining a target trajectory of the motor vehicle to be realized with the safety system, wherein the target trajectory is assigned to a target position of the motor vehicle, which target position is safe with regard to secondary collisions; and
    performing at least one autonomous and/or supporting driving intervention in the form of at least one of a longitudinally guiding intervention and a transverse guiding intervention after the collision for realizing the target trajectory.

2. The method of claim 1, wherein the safety system is a system for mitigating consequences of the unavoidable collision.

3. The method of claim 1, wherein the target trajectory is determined by using environmental data regarding an environment of the motor vehicle.

4. The method of claim 3, wherein the target trajectory is determined before the unavoidable collision, and wherein the unavoidable collision is influenced as a function of the target trajectory.

5. The method of claim 1, wherein the target trajectory is determined by taking an environmental model into account, wherein different standstill positions in a vicinity of the motor vehicle are each assigned a value which is commensurate with a safety of the standstill position with regard to secondary collisions.

6. The method of claim 1, further comprising determining possible static and/or moving collision partners by detecting an environment of the motor vehicle, wherein for determining the safety of the target position and/or a standstill position of the motor vehicle the static and/or moving collision partners are taken into account.

7. The method of claim 6, wherein at least one of a type, an actual dynamic and a predicted trajectory of the possible collision partner is taken into account for determining the safety of the target position and/or the standstill position of the motor vehicle.

8. The method of claim 1, further comprising
    continuously monitoring systems of the motor vehicle to be controlled; and when the target position and/or the target trajectory cannot be reached and the systems to be controlled at least partially fail,
    recalculating the target position and/or the target trajectory and/or taking the at least partial failure into account when cyclically recalculating the target position and/or the target trajectory into account.

9. The method of claim 8, wherein the systems of the motor vehicle to be controlled are continuously monitored after the unavoidable collision.

10. The method of claim 8, wherein the systems of the motor vehicle to be controlled include at least one member selected from the group consisting of a braking system, a motor and a steering.

11. The method of claim 8, further comprising transmitting a message regarding the at least partial failure of the systems to be controlled via at least one communication means for communicating with other road users.

12. The method of claim 8, wherein the systems of the motor vehicle to be controlled include at least one member selected from the group consisting of a braking system, a motor, a steering system, an ESP-system, an active chassis system, an active suspension system, an active stabilizer system, a raisable hood, and a system for adjusting a trim position.

13. The method of claim 1, wherein for determining the target position and/or the target trajectory, information regarding a member selected from the group consisting of a seat occupation, a loading state of the motor vehicle, a structure of the motor vehicle, a deformation potential of a particular region of the motor vehicle, and regions of the motor vehicle which are critical in case of collisions is taken into account.

14. The method of claim 12, wherein the information regarding the deformation potential of the particular region includes information regarding previous damage to the particular region and/or damage to the particular region caused by the unavoidable collision.

15. The method of claim 1, further comprising communicating with other road users via at least one communication means for coordinating an evasive and/or placement strategy and/or transmitting data which describe the secondary collision to a central server.

16. The method of claim 15, wherein the central server is a traffic control center.

17. The method of claim 1, wherein for determining the target position and/or the target trajectory, data of at least one member selected from the group consisting of a yawing sensor, a roll angle sensor, a pitch angle sensor, a steering angel sensor, a friction coefficient sensor, a longitudinally guiding driver assist system, a camera, a laser scanner, a radar sensor, an ultrasonic sensor, an infrared sensor, a LIDAR-sensor, a GPS-sensor, a communication means for communicating with other road users and a crash sensor.

18. The method of claim 1, further comprising, assisting a driver of the motor vehicle in attaining the safe target position.

19. The method of claim 18, wherein the driver is assisted in attaining the safe target position by amplifying and/or attenuating a longitudinally guiding and/or transverse guiding intervention carried out by the driver, and/or by displaying the target position and/or a target location and/or and/or a target orientation of the target position.

20. The method of claim 19, wherein the target position and/or the target location and/or the target orientation of the target position is displayed on a Head-Up-Display.

21. A motor vehicle, comprising a control device for implementing the method of claim 1.

* * * * *

UNITED STATES PATENT AND TRADEMARK OFFICE
CERTIFICATE OF CORRECTION

PATENT NO.         : 9,254,802 B2
APPLICATION NO.    : 13/624201
DATED              : February 9, 2016
INVENTOR(S)        : Oliver Brenneis et al.

It is certified that error appears in the above-identified patent and that said Letters Patent is hereby corrected as shown below:

In the Claims

In column 11, claim 19, line 5: please replace "and/or and/or" with --and/or--.

Signed and Sealed this
Third Day of May, 2016

Michelle K. Lee
*Director of the United States Patent and Trademark Office*